3,065,061
OXIDATION APPARATUS
Willi Fett, Witten (Ruhr), Germany, assignor to Chemische Werke Witten, Witten (Ruhr) Germany
Filed Mar. 9, 1959, Ser. No. 798,009
Claims priority, application Germany Mar. 18, 1958
4 Claims. (Cl. 23—283)

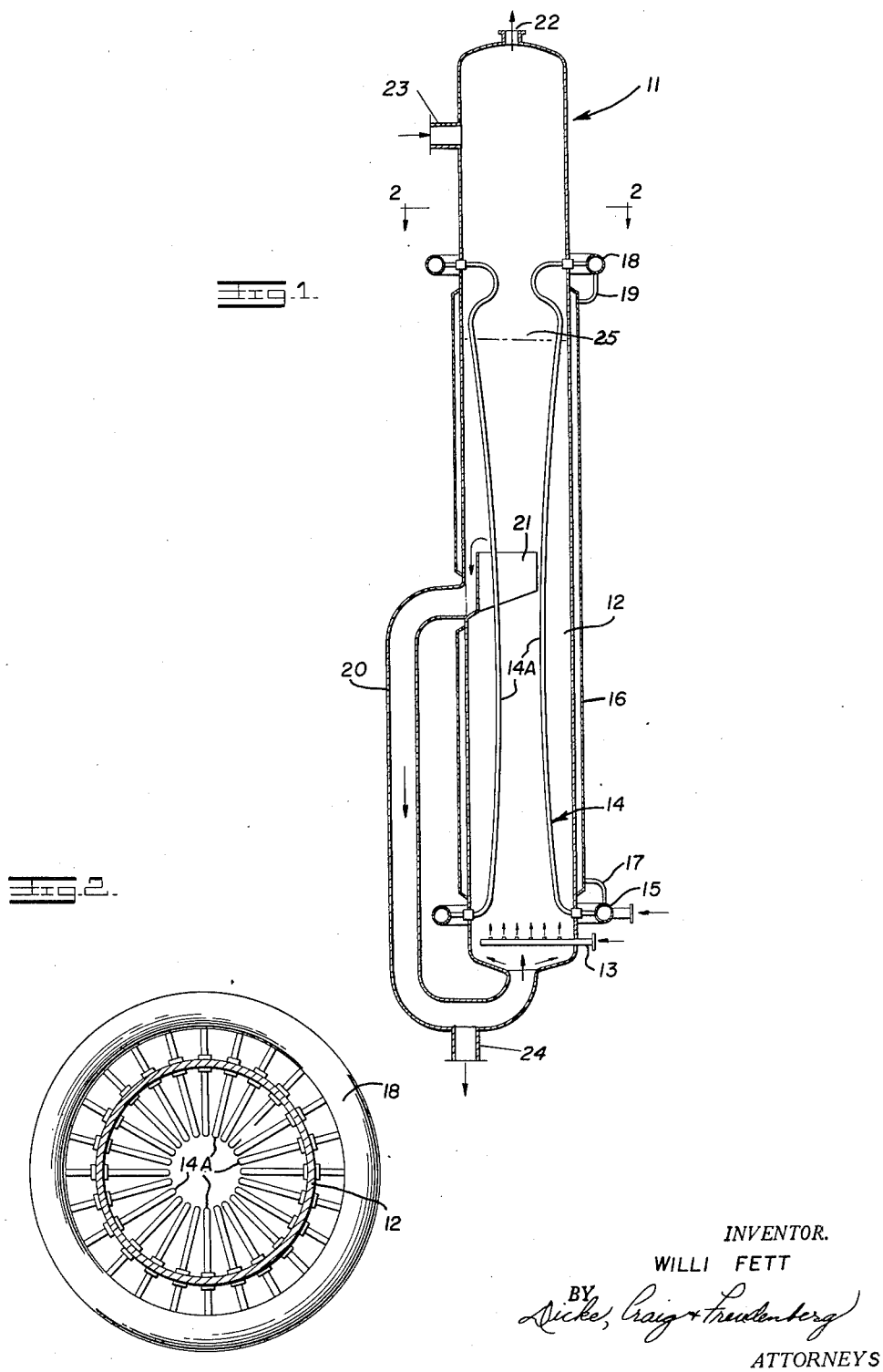

This invention relates to an apparatus for carrying out oxidation reactions. More particularly, this invention relates to an oxidation apparatus usefully employed in the oxidation of alkyl substituted aromatic hydrocarbons having means to remove exothermic heat.

In the oxidation of such alkyl substituted aromatic hydrocarbons as p-xylol to p-toluic acid, the exothermically produced heat of reaction is only partially removed by the gases leaving the oxidation chamber. These gases included, of course, resultant water, as steam, and some of the to-be-oxidized xylol. In the past, in order to retain the xylol in a liquid condition, the oxidation process was carried out under low pressure conditions. In such instances a simple cooling jacket around the reaction chamber was still sufficient to remove the excess heat produced by the reaction. However, as the pressure is increased, the amount of heat which must be dissipated is increased by vast proportions. Consequently, a cooling system must be added to the oxidation apparatus in order to obtain optimum use of the reaction space. The decrease in temperature under which oxidation can take place by employing an efficient cooling system in turn permits an increase of the rate of oxidation with concomitant production of greater exothermic heat.

As was stated, in the presently known relatively large installations employed in, for example, the air oxidation of p-xylol, cooling systems are employed for the removal of excess heat of reaction from the oxidation apparatus which are positioned outside the oxidation reaction chamber itself and through which the to-be-oxidized materials are conducted by means of a pump. When volatile and easily oxidizable substances are oxidized in such installations under necessary high pressure conditions producing higher melting point oxidation products which have a tendency to crystallize, then relatively expensive and complicated installations are required which may become easily clogged by the materials of crystallization that may be produced which are prone to leaks at the flanged connections thereof, and which may produce leaks in the gaskets or rapid wear in the slip-ring seals of the pumps thereby causing recurring stoppages and breakdowns, high maintenance and repair costs and losses in materials. It will be appreciated that, for instance, the removal of clogged tubes will incur extremely extensive repair costs.

Fortunately, according to the present invention, it has now been found that the many disadvantages of the previous devices may be obviated if the excess heat of reaction is dissipated through a special cooling system that is installed and situated within the oxidation apparatus itself and of suitable construction and shape essentially consists of substantially vertically arranged tubes which are appropriately devoid of any welding seams within the oxidation apparatus and terminate in manifold or collective means advantageously located outside the oxidation apparatus in combination with a recirculation tube having an inlet chamber so constructed and arranged as to provide automatic recirculation of the oxidized products.

Accordingly, it is a primary object of the present invention to disclose an oxidation apparatus having a unique construction.

It is another object of the present invention to disclose an oxidation apparatus having a unique cooling system associated therewith.

It is yet another object of the present invention to disclose an oxidation apparatus having a re-circulation system for the to-be-oxidized material.

Additional objects will become apparent upon a detailed consideration of the following descriptive matter taken in conjunction with the accompanying drawings wherein like reference numerals refer to like parts throughout.

FIGURE 1 is a cross section of the oxidation apparatus of the present invention; and
FIGURE 2 is a cross section taken along lines 2—2 of FIGURE 1.

Referring now to the drawing, the oxidation apparatus of the present invention is designated generally in FIGURE 1 by reference numeral 11. It consists of a reaction chamber 12 which may be filled with an oxidizable material through inlet 23. The contents of the reaction chamber are oxidized by the addition of oxygen-containing gas through distributing means 13 of any suitable appropriate construction. The heat of reaction is dissipated by means of a cooling system generally designated by reference numeral 14 which comprises a plurality of elongated vertical tubes or conduits 14A. The conduits are supplied with heat exchange media through a common distributor means or a manifold 15 which is seen to be located outside the reaction chamber. To increase the cooling capacity of the cooling system 14, the reaction chamber is surrounded by a jacket 16 in which additional cooling media are permitted to circulate. The jacket 16 also receives its cooling media from the common external distributor means 15 through conduit 17. The plurality of vertically extending seamless cooling tubes 14A are each provided with a first curved portion with the imaginary center of the radius of curvature thereof disposed inwardly thereof and with a second curved portion with the imaginary center of the radius of curvature disposed outwardly thereof so that each tube 14A is first bent inwardly toward the axis of the oxidation apparatus and thereupon outwardly whereby the upper free end of each tube 14A extends through the walls forming the reaction chamber 12 and terminates in the outlet manifold 18. To obtain optimum effect from the cooling capacity of the system, the tubes are placed equidistant from each other. The normal level of the fluid within the reaction chamber 12 is indicated schematically by the phantom line 25. Each cooling tube 14A discharges into a discharge or outlet manifold system 18 which is seen to be located externally of the reaction chamber and near the upper portion thereof. An outlet 19 is also provided near the top of the outer cooling jacket 16. In order to insure complete oxidation of the material in the reaction chamber a re-circulation conduit 20 is provided. From FIGURE 1, it will be seen that the conduit 20 removes material from near the mid-point of the reaction chamber 12 and distributes the material to the bottom of the reaction chamber 12. The oxidized material may be withdrawn from the reactor 12 through outlet 24 in the re-circulation conduit 20.

In order to facilitate the re-circulation of the to-be-oxidized material through the re-circulation conduit 20, particularly if no circulating pump is used as contemplated by the present invention, and in order to prevent the settling of materials of relatively large specific gravity, a conduit 20 of correspondingly large dimension has to be provided through which the to-be-oxidized material is readily circulated by reason of the differences in the specific gravity of the fluid column within the oxidation apparatus diffused extensively by the oxygen-containing gas and of the fluid in the re-circulating conduit 20 which contains a relatively small amount of this oxygen-containing gas. In order to assure an unobjectionable flawless operation of this conduit for its intended purposes, a deflector chamber 21 is provided at the point of entrance of the re-circulation conduit. The deflector 21 permits the excess gases to bubble upwardly thereby decreasing the specific gravity of the material. The material not being diffused with gases has a higher specific gravity so that it falls downwardly into the uniquely constructed chamber 21 defined by the deflector and is thereupon carried to the bottom of the reaction chamber through the relatively large re-circulation conduit 20.

However, it should be noted that the present invention also contemplates the use of a re-circulation pump in the place of the re-circulating conduit 20 and deflector 21 which withdraws the to-be-oxidized material at an appropriate place from the oxidation apparatus and resupplies it thereto at another place.

Excess gases are permitted to escape the reaction chamber 12 through port 22.

FIGURE 2 clearly shows the unique manner in which the conduits 14A of the cooling system 14 radiate outwardly from the reaction chamber to make connection with the manifold 18.

By constructing the cooling tubes 14A of seamless tubing and by making connection with the distributors outside the reaction chamber 12, a leak-proof system inside the reaction chamber is envisaged which is devoid of any welding seams within the oxidation apparatus and, therefore, avoids with certainty expensive welding repairs therewithin.

The oxidation apparatus of the present invention possesses such an efficient cooling system that there is optimum control of the reaction. The temperature conditions may be so controlled that even during a variety of different pressure conditions the re-crystallization of high melting point oxidation products is avoided. The cooling medium may be water or any other suitable liquid. The reaction conditions may be so controlled that steam may be produced which can be usefully employed.

Preferably, the cooling system in accordance with the present invention, for example, in case of oxidation by means of air of p-xylol, is operated with evaporating condenser water since it is thereby possible to accurately control the reaction process by changing the vapor pressure according to the temperature and to avoid thereby the crystallization of oxidation products having relatively high melting points. It is understood that instead of water, other suitable cooling liquids or the vapors thereof may be used.

By the use of an oxidation apparatus in accordance with the present invention which includes the cooling system 14 installed on the inside thereof together with the recirculating conduit 20 and the inlet chamber 21 it is possible not only to avoid the disadvantages and shortcomings of the prior art devices provided with external cooling systems and recirculating pumps but also to operate with accurately defined oxidation temperatures which are as low as possible since the reaction heat is conducted away directly at the place where it is produced and since no temperature gradients are necessary for external coolers.

The above description exemplifies the present invention, though modifications thereof are considered to be within the scope of the invention. The descriptive matter, therefore, does not limit the present invention which is susceptible of many changes and modifications within the skill of a person versed in the art, and I, therefore, do not wish to be limited thereto but intend to cover all such changes and modifications as are encompassed by the scope of the appended claims.

I claim:

1. An oxidation apparatus for use in the oxidation of alkyl-substituted aromatic hydrocarbons having means for removing exothermic heat and being adapted to operate within accurately defined oxidation temperatures which are as low as possible without the use of a circulating pump, comprising upright wall means forming a reaction chamber having a vertical longitudinal axis, means for introducing liquid alkyl-substituted aromatic hydrocarbons into said reaction chamber, gas distributor means positioned adjacent one end of said reaction chamber for introducing oxygen-containing gas into said reaction chamber for oxidation of the aromatic hydrocarbons, means for cooling said aromatic hydrocarbons in said reaction chamber including a plurality of heat-exchange conduits positioned within said reaction chamber and extending therethrough approximately in the direction of said longitudinal axis and cooling fluid distributor means located externally of said wall means at each end of said reaction chamber, the ends of said heat-exchange conduits being operatively connected with said distributor means for the passage of cooling fluid therethrough to remove the exothermic heat of the oxidation reaction, re-circulation conduit means located without said reaction chamber adjacent said upright wall means for recirculating the oxidation product, said conduit means connecting approximately the mid-point of said reaction chamber with an end portion of the chamber below the gas-distributor means and the heat-exchange conduits whereby the introduction of said gas through said gas distributor means causes recirculation of said oxidation product, and deflector means within the reaction chamber adjacent the connection of said re-circulation conduit means with said chamber forming an inlet chamber surrounding the re-circulation conduit means, said inlet chamber being closed at the bottom thereof and open at the top thereof to allow escape of the gas contained in the material in said inlet chamber and facilitate the re-circulation of the material.

2. An oxidation apparatus according to claim 1, wherein the plurality of heat-exchange conduits are positioned equidistant from each other around the circumference of the reaction chamber, and wherein each of said heat-exchange conduits is provided with a first curved portion with the imaginary center of the radius of curvature thereof disposed inwardly thereof and with a second curved portion with the imaginary center of the radius of curvature disposed outwardly thereof so that each conduit is first bent inwardly toward said longitudinal axis of the reaction chamber and thereupon outwardly of the longitudinal axis, and wherein said deflector means is located without said plurality of heat-exchange conduits.

3. An oxidation apparatus according to claim 1, further comprising cooling jacket means extending over a substantial protion of said upright wall means on the outside thereof and operatively connected with said distributor means located externally of said reaction chamber to provide a flow of cooling medium therethrough.

4. An oxidation apparatus comprising an upright reaction chamber having a vertically extending longitudinal axis, means for cooling said reaction chamber including a plurality of heat-exchange conduits positioned in said reaction chamber and extending approximately in the same direction as said longitudinal axis and distributor means for supplying cooling medium to said conduits located substantially at each end of the reaction chamber, the end portions of said conduits being connected to said distributor means, said distributor means being located externally of said reaction chamber, gaseous distributor means for introducing an oxidizing gas into said reaction chamber positioned in said reaction chamber adjacent the bottom thereof below the ingress position of said heat-exchange conduits, means for introducing a material to be oxidized into the reaction chamber, and re-circulation means for recirculating oxidized material to the bottom of said chamber consisting of a vertical conduit located substantially without said reaction chamber and adjacent thereto, said conduit connecting substantially the mid-point of said reaction chamber with the bottom portion thereof below said gaseous distributor means whereby the introduction of said oxidizing gas through said gaseous distributor means causes re-circulation of said oxidation product and deflector means within said reaction chamber adjacent the ingress end of the re-circulation conduit forming an inlet chamber surrounding the ingress of the re-circulation conduit, said inlet chamber being open at the top thereof and closed at the bottom thereof to allow escape of the oxidizing gas contained in the material in said inlet chamber and facilitate re-circulation of the material.

References Cited in the file of this patent

UNITED STATES PATENTS

| | | |
|---|---|---|
| 2,153,985 | Lieseberg et al. | Apr. 11, 1939 |
| 2,192,124 | Brill et al. | Feb. 27, 1940 |
| 2,403,922 | Hawthorne | July 16, 1946 |
| 2,800,307 | Putney | July 23, 1957 |